United States Patent [19]
Briggs

[11] 3,754,412
[45] Aug. 28, 1973

[54] SLIP CLUTCH DRIVE MECHANISM
[75] Inventor: Forrest A. Briggs, Dayton, Ohio
[73] Assignee: The Standard Register Company, Dayton, Ohio
[22] Filed: Sept. 13, 1971
[21] Appl. No.: 179,942

[52] U.S. Cl.................. 64/29, 192/12 D, 192/56 R, 192/27
[51] Int. Cl............................................. F16d 7/06
[58] Field of Search................ 64/28 R, 29; 192/27, 192/56 R, 67 R, 46, 2, 12 D

[56] References Cited
UNITED STATES PATENTS

| | | | |
|---|---|---|---|
| 2,351,997 | 6/1944 | Morrill | 192/12 D |
| 2,539,836 | 1/1951 | Hoffmann | 192/12 D |
| 3,344,292 | 9/1967 | Hurst | 192/12 D |
| 3,367,460 | 2/1968 | Wanner | 192/12 B |
| 3,608,686 | 9/1971 | Martin et al. | 64/29 |
| 865,486 | 9/1907 | Gannon | 64/29 |
| 651,706 | 6/1900 | Forbes | 192/46 |
| 728,802 | 5/1903 | Kuhlewind | 192/46 |
| 1,021,386 | 3/1912 | Uhlig | 192/67 R |
| 1,104,211 | 7/1914 | Meredith-Jones | 64/29 |
| 3,599,781 | 8/1971 | Hoadley | 64/29 |

Primary Examiner—Manuel A. Antonakas
Assistant Examiner—Randall Heald
Attorney—William R. Jacox et al.

[57] ABSTRACT

A substantially constant torque is transmitted to a braked shaft through a slip clutch including a wheel-like drive member supported for rotation by the shaft and having angularly disposed axial holes which receive corresponding balls. Compression springs are positioned within the holes to urge the balls into engagement with an annular driven member which is secured to the shaft and has angularly disposed V-shaped peripheral recesses for receiving the balls. The recesses and balls are angularly spaced and arranged so that at least one ball is seated in drive position (within a recess) at substantially any angular position of the drive member relative to the driven member to assure immediate rotative movement of the shaft when the brake is released. An axially adjustable plate rotates with the drive member and engages the springs to provide for conveniently changing the substantially constant torque transmitted to the shaft through the balls and the driven member. The clutch functions in the same manner in either direction of rotation of the drive member.

7 Claims, 6 Drawing Figures

Patented Aug. 28, 1973
3,754,412
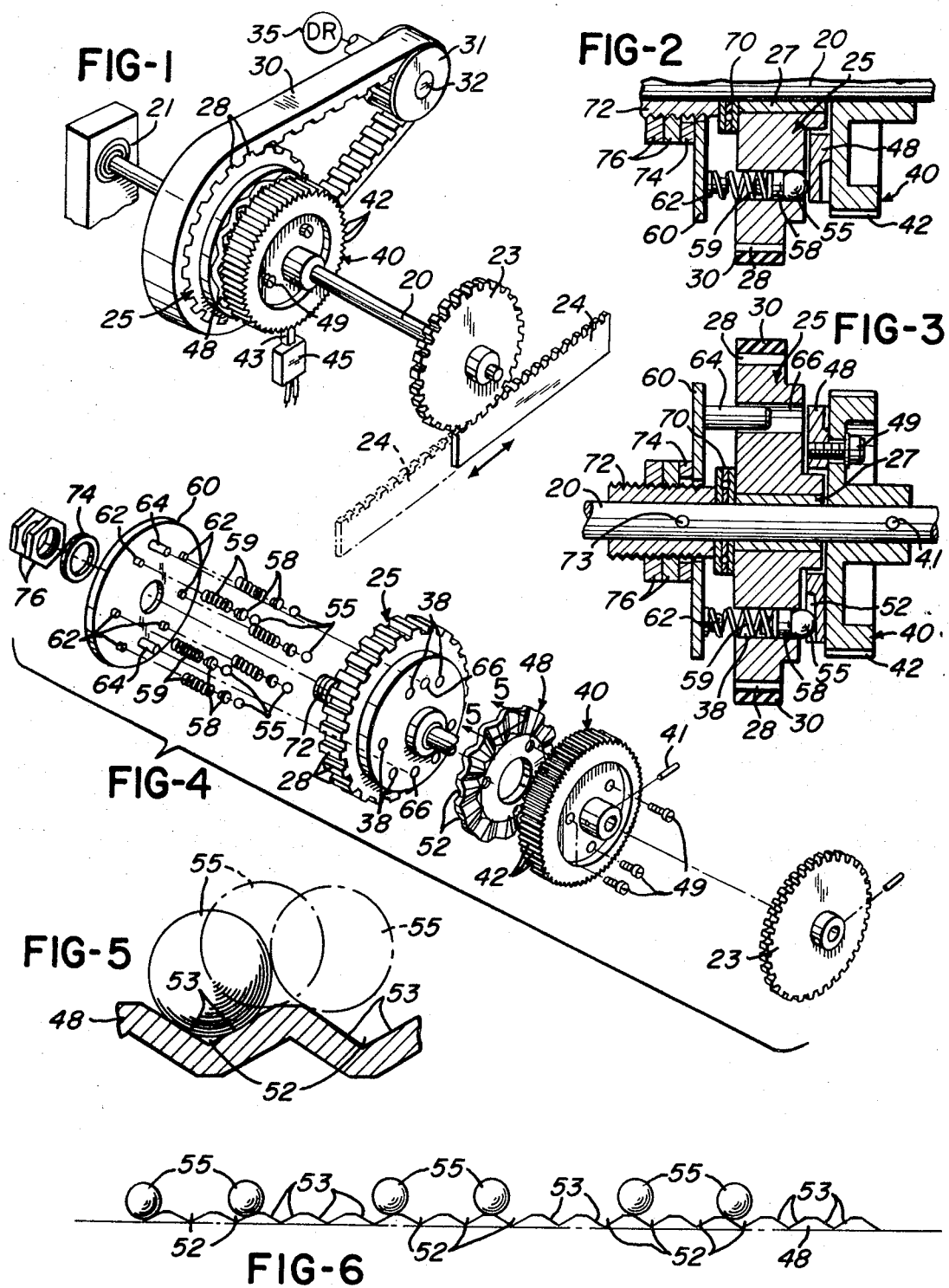
INVENTOR
FORREST A. BRIGGS
BY Jacox & Meckstroth
ATTORNEYS

SLIP CLUTCH DRIVE MECHANISM

BACKGROUND OF THE INVENTION

In a drive system as disclosed in U. S. Pat. No. 3,390,629 which issued to the assignee of the present invention and which is used for advancing a data card support carriage in a step-by-step manner, it is desirable to employ a brake and a slip clutch for indexing a shaft which supports a pinion in engagement with a rack extending along the carriage. The shaft is positively braked against rotation by a solenoid actuated pawl which engages a toothed brake wheel secured to the shaft. When the solenoid is momentarily energized to release the brake by retracting the pawl, the carriage is advanced one step by the torque transmitted to the shaft through the slip clutch.

To obtain high speed step-by-step advancement of the data card support carriage, it is desirable for a substantially constant torque to be continuously transmitted to the carriage drive shaft so that the shaft and carriage immediately advance when the solenoid actuated brake is momentarily released. One form of torque slip clutch which has been proposed employs a pad of rigid clutch material which is compressed between the opposing faces of the drive and driven members. However, it has been found that this type of clutch generates substantial heat when it is subjected to substantial slippage, and the heat affects the characteristics of the clutch material, causing a change in the torque which is being transmitted by the clutch. That is, the substantial slippage causes a residue to be released from the faces of the clutch pad thereby causing glazing of the faces and a corresponding change in the coefficient of friction of the pad.

There are a number of U. S. patents disclosing slip clutches which incorporate a plurality of spring loaded balls in one member and a corresponding plurality of semi-spherical cavities or recesses within the other member. For example. U. S. Pat. No. 651,706 and No. 1,496,577 disclose slip clutches wherein a plurality of balls are spring loaded in a radial direction, and U. S. Pat. No. 865,486 and No. 2,806,366 disclose slip clutches having a plurality of balls which are spring loaded in an axial direction. The slip clutch disclosed in each of these patents presents the problem that the torque transmission is not substantially constant, but fluctuates significantly as the balls roll simultaneously in and out of the recesses when slippage occurs. This fluctuation of torque is particularly undesirable in a drive system for advancing a data card support carriage as shown in above U.S. Pat. No. 3,390,629 since the torque fluctuation does not provide for immediate movement of the carriage when the driven member is released and thus does not provide for step-by-step advancement of the carriage in a rapid, smooth and uniform manner.

SUMMARY OF THE INVENTION

The present invention is directed to an improved bi-directional slip clutch which is ideally suited for use in a drive for producings step-by-step advancement of a data card support carriage, but may also be used in other drives whenever the transmission of substantially constant torque is desired. The slip clutch of the invention is especially desirable when substantial slippage is required in the drive system and also provides the important advantages of a long and dependable service life with the minimum of maintanence.

The slip clutch of the invention is positioned between a constantly rotating drive member and a driven member which is held against rotation until rotation of the driven member is desired. As a result of the transmission of substantially constant torque by the slip clutch, the driven member rotates substantially immediately when the driven member is released. In accordance with one embodiment of the invention, the drive member is mounted on a shaft for relative rotation and is driven by a suitable drive. A plurality of angularly spaced holes extend axially within the drive member and receive corresponding balls which are urged by corresponding compression springs towards a plate secured to the shaft and having peripherally spaced V-shaped recesses for receiving the balls. The springs extend from a common annular adjustment plate which rotates with the drive member, and the balls and recesses are angularly spaced and arranged so that there is always at least one ball seated in driving relation within one of the recesses at any particular position of the drive member relative to the driven member. As a result, when the shaft is momentarily released by actuation of a brake, the shaft is immediately rotated or advanced due to the substantially constant torque being transmitted from the drive member to the driven member through the rolling balls.

Other features and advantages of the invention will be apparent from the following description, the accompanying drawing and the appended claims.

BRIEF DESCRIPTION OF THE DRAWINGS

FIG. 1 is a perspective view of a drive mechanism incorporating a slip clutch constructed and assembled in accordance with the invention;

FIG. 2 is a fragmentary axial section of the slip clutch in FIG. 1 and showing one position of a spring biased driving ball;

FIG. 3 is a full axial section of the slip clutch in FIG. 1 and showing one of the balls in its driving position;

FIG. 4 is a perspective exploded view of the slip clutch assembly shown in FIG. 3;

FIG. 5 is an enlarged fragmentary section taken generally on the line 5—5 of FIG. 4 and illustrating the rolling path of a driving ball; and FIG. 6 is a diagrammatic linear development of the angular arrangement and spacing of the driving balls and recesses employed in the slip clutch shown in FIGS. 1-4.

DESCRIPTION OF THE PREFERRED EMBODIMENT

As mentioned above, the drive system shown in FIG. 1 is particularly suited for producing precise step-by-step advancement of a data card support carriage as disclosed in the above U.S. Pat. No. 3,390,629. Preferably, the drive system includes an elongated shaft 20 having each end supported by an anti-friction bearing block assembly 21. A gear 23 is rigidly secured to the shaft 20 and engages an elongated rack 24 which is adapted to be secured to the data card support carriage in a suitable manner, for example, as illustrated in the above U.S. Pat. No. 3,390,629.

In accordance with the present invention, an annular drive member or wheel 25 is mounted for rotation on the shaft 20 and includes a sleeve-type bronze bearing 27 which receives the shaft 20. The drive wheel 25 has peripherally spaced teeth 28 which are engaged by an endless gear belt 30 extending around the wheel 25 and also around a drive pinion 31 mounted on a shaft 32 connected to a suitable drive motor 35. A series of six axially extending holes 38 are formed within the drive wheel 25, and the holes are arranged in three pairs, with each pair of holes located approximately 120° from the other two pairs of holes. The angular spacing between the holes of each pair is approximately 45°.

A brake wheel 40 is rigidly secured to the shaft 20 by a cross pin 41 and includes peripherally spaced teeth 42 which are adapted to be selectively engaged by a stop pawl 43 actuated by a solenoid 45. In a manner as disclosed in above U.S. Pat. No. 3,390,629, the pawl 43 is spring biased towards the brake wheel 40 and prevents rotation of the brake wheel and shaft 20 until the solenoid 45 is energized to retract the pawl 43.

Referring to FIG. 3, an annular clutch plate 48 is positioned concentrically with the shaft 20 and is rigidly secured to the brake wheel 40 by a series of axially extending screws 49. As shown in FIGS. 4 and 5, the outer peripheral portion of the clutch plate 48 is deformed in a zig-zag manner to define peripherally spaced recesses or grooves 52 each of which is defined by a set of flat surfaces 53 disposed to form an included angle of approximately 120°. As illustrated diagrammatically in FIG. 6, the peripheral portion of the clutch plate 48 has sixteen uniformly spaced recesses or grooves 52 which are located at a diameter to be in opposing relation to the holes 38 within the drive wheel 25.

A ball 55 is located within each of the holes 38 within the drive wheel 25, and each ball 55 is urged into engagement with the clutch plate 48 by a seat member 58, preferably formed of a low friction plastics material, and a compression spring 59 which extends between the seat member 58 and an annular concentric spring retaining plate 60. Locating studs 62 project from the plate 60 into the adjacent end portions of the springs 59, and a pair of diametrically spaced pins 64 project axially from the plate 60 into corresponding bores or holes 66 formed within the drive wheel 25 between the ball retaining holes 38 so that the plate 60 rotates with the drive wheel 25.

An antifriction thrust bearing 70 is mounted on the shaft 20 between the drive wheel 25 and an externally threaded sleeve 72 which is rigidly secured to the shaft 20 by a cross pin 73. A washerlike bronze bearing 74 surrounds the sleeve 72 and is positioned between the spring retaining plate 60 and a pair of lock nuts 76 threaded on the sleeve 72. Thus the force at which the balls 55 are urged axially against the clutch plate 48 may be conveniently adjusted simply by adjusting the axial position of the lock nuts 76 on the threaded sleeve 72.

When the drive mechanism shown in FIG. 1 is used for producing rapid step-by-step advancement of a data card support carriage as shown in above U.S. Pat. No. 3,360,629, the drive wheel 25 is rotated continuously at a predetermined speed through the gear belt 30. While the card is being punched, the shaft 20 is prevented from rotating by engagement of the stop pawl 43 with the brake wheel 40. Thus during this short time period, the drive wheel 25 is rotating relative to the clutch plate 48 causing the balls 55 to roll in and out of the recesses or grooves 52 as illustrated in FIG. 5.

As a result of the particular angular spacing of the holes 38 and balls 55 relative to the uniform angular spacing of the grooves 52, there is always one ball 55 which is substantially seated within a groove 52 regardless of the position of the drive wheel 25 relative to the clutch plate 48. For example, the ball 55 shown at the left end of FIG. 6 is seated in driving relation within one of the grooves 52, and after slight additional relative rotation between the drive wheel 25 and the clutch plate 48, the adjacent ball 55 shown at the right end of FIG. 6 will be located or seated in driving relation within the adjacent groove 52. Thus when the brake wheel 40 is mementarily released by retraction of the pawl 43, the brake wheel 40 and the shaft 20 rotate immediately with the drive wheel 25 due to the substantially constant torque being transmitted by the balls 55 to the clutch plate 48.

It is apparent that the substantially constant torque being transmitted may be increased or decreased by different means. For example, the springs 59 may be removed and replaced by springs constructed of wire having a different diameter, or the clutch plate 48 may be replaced by another clutch plate having grooves formed by surfaces 53 defining a different included angle therebetween. It is also apparent that the level of substantially constant torque being transmitted from the drive wheel 25 to the clutch plate 48 may be conveniently changed by adjusting the axial position of the lock nuts 76 on the threaded sleeve 72, thereby adjusting the axial position of the spring retaining plate 60 and the force exerted by the balls 55 against the clutch plate 48.

From the drawing and the above description, it is apparent that a slip clutch constructed in accordance with the present invention, provides desirable features and advantages. For example, as a result of the rolling contact between the balls 55 and the clutch plate 48, the slip clutch is ideally suited for drive systems where substantial slippage is required. The slip clutch is bidirectional and is effective to transmit a substantially constant torque which can be conveniently changed as desired and thus is particularly useful in a drive mechanism providing for positive, rapid and dependable intermittent or step-by-step motion in precise increments and without any significant time delay during each step of advancement.

While the form of slip clutch herein described constitutes a preferred embodiment of the invention, it is to be understood that the invention is not limited to this precise form of clutch, and that changes may be made therein without departing from the scope and spirit of the invention. Furthermore, while the slip clutch is illustrated and described in connection with a drive mechanism for producing precise and rapid step-by-step advancement of a data card support carriage, the slip clutch may be used for many other applications whenever it is desirable to maintain a substantially constant torque between a driven member and a relative rotating driving member.

The invention having been described, the following is claimed:

1. An improved slip clutch comprising a shaft, an annular drive member mounted on said shaft for relative rotation, means for rotating said drive member, means defining a plurality of angularly spaced and generally axially extending openings within said drive member, a ball within each of said openings, an annular brake member positioned on one side of said drive member and secured to said shaft for rotation therewith, means forming a plurality of angularly spaced recesses on said brake member in axially opposing relation to said balls within said drive member, means for braking the rotation of said brake member and said shaft causing said balls to roll between said drive member and said brake member, said recesses being arranged relative to said openings to position at least one of said balls in seating relation within one of said recesses at substantially any angular position of said drive member relative to said brake member to provide immediate positive torque transmission from said drive member to said shaft upon release of said braking means, means positioned on the other side of said drive member for urging said balls into said recesses, and means for simultaneously adjusting the force exerted by said means for urging said balls to provide for conveniently and precisely adjusting the torque transmission from said drive member to said shaft.

2. A slip clutch as defined in claim 1 wherein said drive member comprises a wheel having peripherally spaced teeth and, said rotating means comprise a gear belt.

3. A slip clutch as defined in claim 1 wherein said means forming said recesses, comprise a clutch plate positioned between said drive member and said brake member and having a generally uniform thickness, and means for securing said disc to said brake member.

4. A slip clutch as defined in claim 1 wherein said means for urging said balls into said recesses, comprise a plurality of compression springs extending within said openings within said drive member, an annular retaining member surrounding said shaft and confining said springs within said openings, and means connecting said retaining member to said drive member for rotation therewith.

5. A slip clutch as defined in claim 4 wherein said adjustment means comprise a tubular threaded bushing secured to said shaft for rotation therewith, and nut means adjustably mounted on said bushing for confining said retaining member.

6. An improved slip clutch comprising a shaft, an annular drive member mounted on said shaft for relative rotation, means for rotating said drive member, means defining a plurality of angularly spaced and generally axially extending openings within said drive member, a ball within each of said openings, an annular brake member secured to said shaft for rotation therewith, a clutch plate positioned axially between said drive member and said brake member and secured to said brake member, said clutch plate having a generally uniform thickness and a plurality of angularly spaced grooves in axially opposing relation to said balls within said drive member, means for braking the rotation of said brake member and said shaft causing said balls to roll between said drive member and said brake member, said grooves being arranged relative to said openings to position at least one of said balls in seating relation within one of said grooves at substantially any angular position of said drive member relative to said brake member to provide immediate positive torque transmission from said drive member to said shaft upon release of said braking means, and means for adjusting the force exerted by said balls against said clutch plate to provide for adjusting the torque transmission from said drive member to said shaft.

7. A slip clutch as defined in claim 6 wherein each said groove is defined by converging surfaces defining an angle of approximately 120° therebetween.

* * * * *